United States Patent [19]
Jurovsky

[11] 3,894,436
[45] July 15, 1975

[54] DIFFERENTIAL PRESSURE GAUGE

[76] Inventor: Albert Yakovlevich Jurovsky, ulitsa Baltiiskaya, 4, kv. 94, Moscow, U.S.S.R.

[22] Filed: June 11, 1974

[21] Appl. No.: 478,335

[30] Foreign Application Priority Data
June 18, 1973 U.S.S.R............................. 1933185

[52] U.S. Cl...................... 73/393; 73/407 R; 92/1; 92/97
[51] Int. Cl......................... G01l 19/04; G01l 7/08
[58] Field of Search ........ 73/407 R, 393, 406; 92/1, 92/97

[56] References Cited
UNITED STATES PATENTS
3,724,275   4/1973   Battaglini.......................... 73/407 R
3,822,596   7/1974   Bonner.............................. 73/407 R

*Primary Examiner*—Donald O. Woodiel
*Attorney, Agent, or Firm*—Holman & Stern

[57] ABSTRACT

A differential pressure gauge is provided with a base and two membranes secured along the outer contour to the opposite sides of the base. The membranes are rigidly interconnected by their middle portions, are located at a certain distance from the base and define, together with the base, a pressure-tight space filled with a liquid. Besides, the membranes are rigidly fastened to the base along the circular portions which are concentric with the outer contours of the membranes while the circular peripheral spaces thus separated from the pressure-tight space communicate with the latter through channels.

2 Claims, 2 Drawing Figures

DIFFERENTIAL PRESSURE GAUGE

BACKGROUND OF THE INVENTION

The present invention relates to the instrument-building industry and more particularly to differential pressure gauges.

PRIOR ART

Known in the art is a differential pressure gauge comprising a base, two membranes secured along the outer contour to the opposite sides of the base and forming, together with the latter, a pressure-tight space filled with a liquid. Each membrane is located at a certain distance from the base and the middle portions of the membranes are rigidly interconnected through a hole in the base. There is a means for transmitting the motion of the membranes caused by the difference of pressures with, the input of this means being connected with the middle portions of the membranes, and a means which transmits the motion of the membranes into an output signal with, the input of this means being connected to the output of the first means (U.S. Pat. No. 3,563,133,).

The known differential pressure gauge produces erroneous readings caused by the changes in the temperature and static pressure acting on both sides of the membrane assembly of the gauge. These factors change the initial volume of the liquid in the pressure-tight space which results in deformation of the flexible casings of the membranes and, eventually, in the undue motion of the middle portions of the membranes which leads to errors of the output signal.

OBJECTS AND SUMMARY OF THE INVENTION

An object of the present invention is to improve the accuracy of the differential pressure gauge by reducing its temperature error and the error caused by compressibility of liquid at high static pressures.

Another object of the invention is to improve corrosion resistance of the membrane assembly of the gauge.

Still another object of the invention is to protect the membranes of the gauge against the damaging effect of onesided overload pressure.

A still further object of the invention is to provide a differential pressure gauge which is simple in design and characterized by high accuracy of measurements.

These objects are achieved by providing a differential pressure gauge comprising a base; two membranes secured along the outer contour to the opposite sides of the base, rigidly interconnected by their middle portions through a hole in the base and defining, together with the base, a liquid-filled pressure-tight space; a means connected with the middle portions of the membranes and transmitting the motions of the membranes caused by the difference of pressures, and a means interacting with the first means and serving to transform said motions of the membranes into an output signal in which, according to the invention, each membrane is additionally fastened rigidly to the base along a circular zone which is concentric with the outer contour of the membrane while the circular peripheral spaces separated from the pressure-tight space communicate with the latter through channels.

It is practicable that each membrane be provided with a valve for sealing off the hole in the base in case of a one-sided effect of overload pressure and that the base be provided with circular projections for fastening to the circular zones of the membranes and that said projections be provided with channels.

The differential pressure gauge realized in accordance with the present invention has the following advantages;

It ensures a high accuracy in measuring the pressure difference due to the fact that each membrane is fastened to the base on a circular zone which separates the peripheral circular space communicating with the liquid-filled space of the instrument. The peripheral circular portion of the membrane casing which defines the circular space functions as an expansion piece to make up for the changes in the volume of liquid in the gauge caused by such external factors as temperature and pressure.

The advantages of such an instrument become particularly conspicuous in measuring comparatively large pressure differentials (0.4 kgf/cm$^2$ and above) when use is made of a small effective area of membranes limited by a small-diameter circular zone white the peripheral casing of the membrane has, in this case, a large surface and is characterized by high elasticity.

Another advantage of the gauge is simplicity in solving the problem of improving the measuring accuracy, and reducing the temperature error and the error caused by compressibility of liquid under the effect of static pressure.

The expansion pieces formed by the peripheral circular zones of the membrane casings are made without interfering with the integrity of these casings which raises the corrosion resistance of the instrument in comparison with the instruments provided with other types of expansion pieces since the expansion pieces according to the invention have no additional welded joints and additional parts contacting the working medium.

Another advantage of the gauge is simplicity in protecting the membranes with circular expansion pieces against one-sided pressure overload. Protection of the membrane casing with a circular expansion piece against damage by overload pressure is easily achieved by providing a base which is profiled after the shape of the membrane or by providing a valve which closes the central hole in the base and prevents the flow of the liquid.

Due to the provision of two expansion pieces (on each membrane), a one-sided pressure overload of one membrane does not overstrain the casing of the other membrane because the liquid forced from under the membrane with a peripheral circular expansion piece acts on the corresponding portions of the casing of the other membrane. Besides, two expansion pieces prove to be more efficient in reacting to the increase of the liquid volume which improves the measuring accuracy and reduces the errors caused by the effect of temperature and static pressure.

Now the invention will be described by way of example with reference to the accompanying drawings, in which:

DETAILED DESCRIPTION OF THE INVENTION

Figure 1:
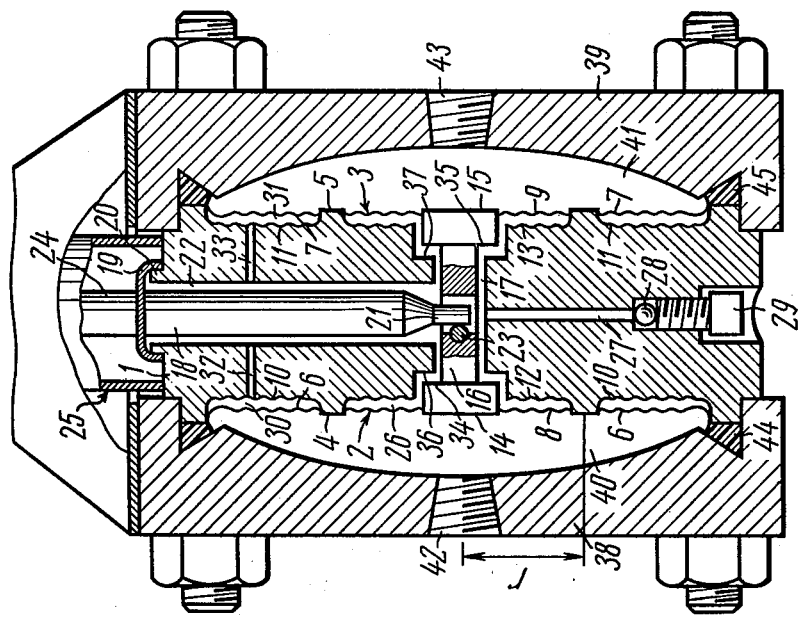
FIG. 1 is a view partly in section and partly in elevation of the differential pressure gauge according to the invention.

According to FIG. 1, the differential pressure gauge comprises a disc-shaped base 1 and the two membranes 2 and 3 secured along the outer contour to the opposite sides of the base 1. Each membrane 2,3 has a circular zone 4 and 5 rigidly secured to the base 1, in this case by welding.

Each membrane 2,3 is separated by the circular zone 4,5, respectively, into peripheral and middle portions 6,7 and 8,9, respectively. The peripheral portions 6 and 7 of the membranes 2, 3 located outside the circular portions 4,5 are set at a certain distance from surfaces 10 and 11 of the base 1. The middle portions 8 and 9 of the membranes 2,3 located inside the circular zones 4,5 are also set at a certain distance from surfaces 12 and 13 of the base 1, with middle portions 14 and 15 of the membranes 2,3 being rigidly interconnected by a rod 16 which extends through a central hole 17 in the base 1.

The circular zones 4,5 of the membranes 2,3 have mean radii r at which the effective surface of the peripheral portions 6,7 is larger than the effective surface of the middle portions 8,9 of the membranes 2,3 while the elasticity of the peripheral portions 6,7 is higher than that of the casing of the middle portions 8,9. Both circular zones 4 and 5 have equal mean radii r to ensure equal effective areas of the middle portions 8 and 9.

The surfaces 10, 11 and 12, 13 of the base 1 correspond to the shape of membrane corrugations on portions 6,7 and 8,9, respectively, of the membranes 2 and 3, pressed against the base 1 by a one-sided overload pressure.

Each membrane 2,3 is fastened to the rod 16 without interfering with the pressure-tightness and integrity of the membrane casing, in this case, by welding.

The gauge comprises a means for transmitting the motion of the membranes caused by the pressure difference, with such means consisting of a lever 18 with a pressure-tight flexible support in the form of a small-diameter membrane 19 fastened to a projection 20 of the base 1. A first end 21 of the lever 18 extends through a bore 22 in the base 1 with a certain clearance and interacts with the rod 16 by means of a pin 23 secured in the rod 16. A second end 24 of the lever 18 is located outside the base 1 on the other side of the pressure tight membrane 19 and interacts with a means 25 which transforms the motion of the membranes into an output signal. In the example, the means 25 is constituted by an electric converter.

The membranes 2 and 3 are fastened to the base 1 at a certain distance from the latter and form there with a pressure-tight space 26 filled with liquid through a channel 27 in the base 1, said with the channel 27 being sealed by a ball 28 and a screw 29. The circular zones 4 and 5 on which membranes 2 and 3 are additionally fastened rigidly to the base 1 separate the circular peripheral spaces 30 and 31, respectively, from the pressure-tight space 26, with spaces 30 and 31 communicating with the pressure-tight space 26 through channels 32 and 33 in the base 1.

The rod 16 has bearing surfaces 34 and 35 which are arranged at a certain distance from bearing surfaces 36 and 37 on the base 1 and which limit the motion of the membranes 2,3 when they are subjected to a one-sided overload pressure.

Flanges 38 and 39 fastened to the base 1 form spaces 40 and 41 used to feed the measured pressures to the membranes 2 and 3 through holes 42 and 43 respectively. Sealing rings 44 and 45 of fluorinated plastic seal off the spaces 40 and 41 along the outer contour of the membranes 2 and 3 thus protecting the base 1 against contact with the working medium while measuring the pressure difference. The flanges 38, 39 and membranes 2,3 can be made of various corrosion-resistant materials such as hastelloy, titanium, nickel, tantalum, etc.

The lever 18 receiving the motion of the membranes 2,3 caused by the pressure difference is located in the inner pressure-tight space 26 of the membrane assembly of the gauge which is filled with a neutral silicon liquid. Therefore, the lever 18 and membrane 19 are not affected by the working medium which improves the corrosion resistance of the gauge as a whole.

Figure 2:
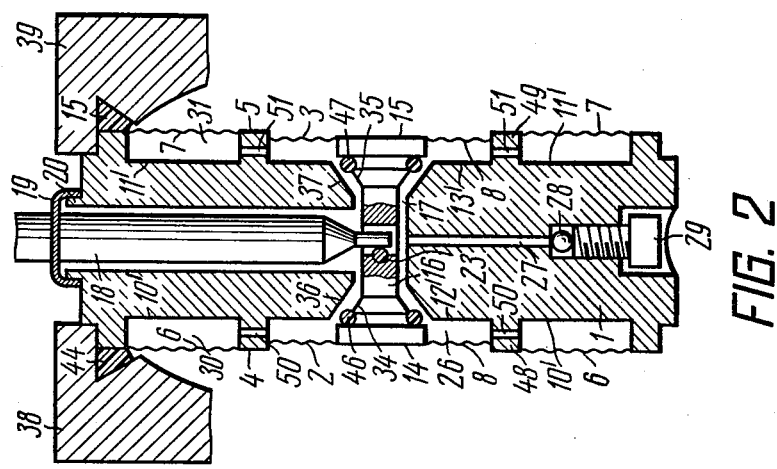
FIG. 2 is a partly in section and partly in elevation of the membrane assembly of the same gauge according to the invention.

The version of the membrane assembly of the gauge shown in FIG. 2 is provided with a means which protects the membranes 2,3 against damage caused by a one-sided effect of overload pressure. This means is designed as follows.

The rod 16 is provided with valves 46 and 47 contacting the middle portions 14, 15 of the membranes 2,3 and is made in the form of sealing rubber rings. These rings are located at a certain distance from the bearing surfaces 36 and 37 of the base 1 and can seal off reliably the hole 17 in the base 1 at the side where the overload pressure is applied.

In this embodiment of the gauge, the base 1 has circular projections 48 and 49 whose face surfaces are welded to the circular portions 4,5 of the membranes 2 and 3, respectively. The circular peripheral spaces 30 and 31 communicate with the pressure-tight space 26 through channels 50 and 51 in the circular projections 48 and 49.

In this case surfaces $10^1$, $11^1$, $12^1$ and $13^1$ of the base 1 are flat because the membranes 2 and 3 do not contact them during pressure overloads.

The differential pressure gauge operates as follows;

The higher of the two measured pressures is fed to the membrane 2 (FIG. 1) through the hole 42 in the flange 38. The lower pressure is fed to the membrane 3 through the hole 43 in the flange 39. Both pressures are transformed on the effective surfaces of the middle portions 8 and 9 of the membranes 2,3 into proportional forces directed towards each other and acting along the common axis of the membranes 2,3 and rod 16. The resultant force which is equal to the difference of the acting forces is transmitted by the pin 23 to the end 21 of the lever 18 which turns through a certain angle relative to the axis of the membrane 19. The other end 24 of the lever 18 interacts with the means 25 which transforms the turning of the lever 18 into an electric output signal.

The present differential pressure gauge has but a small temperature error and the error caused by the compressibility of liquid at high static pressures. it is known that variations in the temperature and static pressure acting on both sides of the membranes 2 and 3 cause changes in the initial volume of the liquid contained in the membrane assembly of the gauge (pressure-tight space 26). This change in the volume of the liquid is taken largely by the flexible surface of the peripheral zone 6 or 7 of each membrane 2, 3 so that the casing of the middle portion 8 or 9 of each membrane 2, 3 is deformed but little and the middle portions 14 and 15 of the membranes 2, 3 together with the rod 16 are not shifted substantially from their initial positions thus causing no reading errors of the gauge.

The differential pressure gauge will be most useful for controlling a large pressure differential, e.g. from 0.4 to 10 kgf/cm$^2$. In this case, a general rule is to use membranes with a sufficiently small effective area so that it is easy to ensure the required relation between the effective surfaces of the peripheral and middle zones of the membranes without substantial increase in the size of the entire instrument.

As the membrane 2 (FIG. 1) is subjected to a one-sided overload pressure, its peripheral zone 6 and the casing of the middle zone 8 are pressed against the surfaces 10 and 12 of the base 1 whose shape matches the shape of membrane corrugations and thus protect the membrane 2 against damage. The middle portion 14 of the membrane 2 moves together with the rod 16 until the bearing surface 34 of the rod 16 comes in contact with the bearing surface 36 of the base 1 when the middle portion 15 and the casing of the middle zone 9 of the membrane 3 withdraw from the surfaces 37 and 13 of the base 1. Meanwhile, the membrane 3 is acted upon by the volume of the liquid which is displaced by the membrane 2 subjected to the overload pressure. The liquid is forced from the space 30 into the space 31 through the channels 32 and 33 in which case, the peripheral zone 7 of the membrane 3 deflects, thus increasing the distance to the surface 11 of the base 1.

In case of a application of one-sided overload pressure to the membrane 3, it is protected against damage in a similar manner.

When a one-sided overload pressure is applied to the membrane 2, the gauge whose membrane assembly is illustrated in FIG. 2 operates as follows;

Being acted upon by the overload pressure, the middle portion 14 of the membrane 2 moves together with the rod 16 until the surface 34 of the rod 16 comes in contact with the bearing surface 36 of the base 1; then the valve 46 seals off the hole 17 in the base 1 and prevents the discharge of the liquid from the spaces under the membrane 2 (peripheral circular space 30 and pressure-tight space 26 communicating therewith through channels 50 and located directly under the middle portion 8 of the membrane 2). The liquid locked in this spaces prevents deflection of the peripheral zone 6 and of the casing of the middle portion 8 of the membrane 2 thus protecting the latter against damage.

In case of a application of one-sided overload pressure to membrane 3, it is protected against damage in a similar way, with the hole 17 in the base 1 being sealed off by the valve 47.

I claim:

1. A differential pressure gauge comprising a base having an outer contour and opposite sides; two membranes secured along the outer contour to the opposite sides of said base; a circular zone on each of said membranes arranged concentric with its outer contour and serving for additional rigid fastening of each of said membranes to said base; said base having a hole; middle portions of said membranes rigidly interconnected through said hole in the base; a pressure-tight space between said base and said membranes; a liquid contained in said pressure-tight space; circular peripheral spaces separated by said circular zones of the membranes from said pressure-tight space; channels which provide communication between said circular peripheral spaces and said pressure-tight space; a means connected with said middle portions of the membranes and serving to transmit the motion of the membranes caused by the difference of pressures; and a means which transforms the motion of the membranes into an output signal and interacts with said first means.

2. The differential pressure gauge as claimed in claim 1 comprising a valve on each of said membranes for sealing off said hole in the base on application of a one-sided overload pressure; circular projections on said base for fastening to said circular zones with said channels being in said projections.

* * * * *